United States Patent Office 3,646,038
Patented Feb. 29, 1972

3,646,038
1-(N-METHYLPIPERAZINEACETYL)
AMINOFLUORENE
René Rachel De Ridder, Brussels, Belgium, assignor to
Manufacture de Produits Pharmaceutiques A. Christiaens Societe Anonyme, Brussels, Belgium
No Drawing. Filed Oct. 13, 1967, Ser. No. 675,076
Claims priority, application Great Britain, Oct. 14, 1966,
46,129/66, 46,131/66
Int. Cl. C07d 51/70
U.S. Cl. 260—268 TRI
1 Claim

ABSTRACT OF THE DISCLOSURE

Derivatives of 1-aminofluorene of the formula:

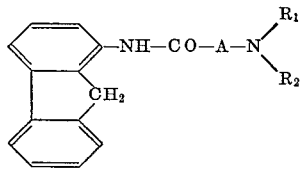

and the pharmaceutically acceptable addition salts thereof, in which A is —$CH_2$— or

$R_1$ and $R_2$ are identical or different and each represents a methyl, ethyl, propyl or butyl group, or $R_1$ and $R_2$ represent together with the attached nitrogen atom a nitrogeneous heterocyclic group having 1 or 2 nitrogen atoms as hetero-atoms and 4 or 5 carbon atoms in the ring, are effective as anticonvulsants.

---

This invention relates to new derivtives of 1-aminofluorene and 1-aminofluorenone, to the preparation thereof and to the use thereof in the pharmaceutical field.

The new compounds according to the invention may be represented by the following formula

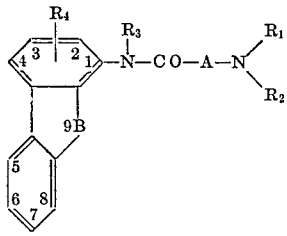

in which A represents a —$CH_2$—, —$CH_2$—$CH_2$— or

group, $R_1$ and $R_2$ which may be identical or different represent hydrogen, a lower $C_1$-$C_4$ alkyl group or a lower β-hydroxyalkyl group, $R_1$ and $R_2$ may also represent together with the attached nitrogen atom a nitrogenous heterocyclic group, $R_3$ represents hydrogen or a lower alkyl group, $R_4$ represents hydrogen or a chlorine or bromine atom in the 2- or 4-position, B represents a >C=O or >$CH_2$ group.

The new compounds of the Formula I may be prepared by reacting a compound of the formula

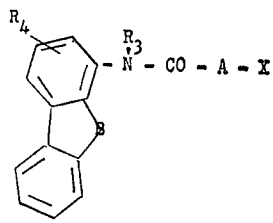

in which A, B, $R_3$ and $R_4$ have the above indicated meanings, whereas X reprseents a chlorine, bromine or iodine atom, with ammonia or a primary or secondary amine or with a nitrogenous heterocyclic compound, in the presence of various solvents, such as methanol, ethanol or isopropanol.

The compounds of the Formula II which are either 1-(halogenoacyl)aminofluorenes or 1-(halogenoacyl) aminofluorenones may be obtained by reacting a compound of the formula:

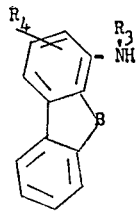

in which R, $R_3$ and $R_4$ have the above indicated meanings, with an acid halide of the formula

in which A has the above indicated meaning and X represents a chlorine or bromine atom.

The compounds of Formula II wherein X represents an iodine atom may be obtained by iodination of the corresponding compound wherein X represents a chlorine or bromine atom, by conventional iodination methods.

The compounds of the Formula III, wherein $R_3$ represents a lower alkyl group, may be obtained by alkylating the corresponding compound wherein $R_3$ represents hydrogen, by conventional alkylation methods.

The compounds of the Formula III, in which $R_4$ represents a halogen atom may be obtained by halogenating the 1-aminofluorenone by the usual halogenation methods and by alkylating the obtained compound, when it is desired to obtain a compound of the Formula III, wherein $R_3$ represents an alkyl group, such as the methyl group.

It is also possible to obtain the compounds of the Formula I wherein $R_1$ and $R_2$ are both H by hydrolyzing in the presence of acetic acid and hydrobromic acid a compound of the formula

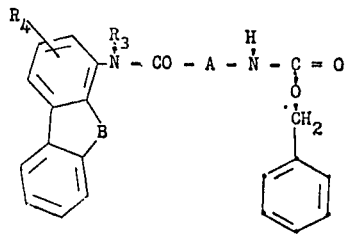

The compounds of Formula V may be obtained by two methods.

The first of these methods involves the reaction of a compound of Formula I with a compound of formula

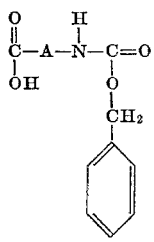

(VI)

in which A has the above indicated meaning, in the presence of N,N'-dicyclohexylcarbodiimide.

The second method for preparing the compounds of the Formula V consists in reacting the compounds of the Formula III with compounds of the formula

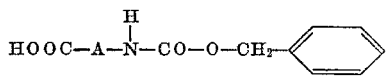

(VII)

wherein A has the above indicated meanings in the presence of N,N'-dicyclohexylcarbodiimide.

Among the compounds of the Formula I according to this invention, the following may be cited by way of examples:

1-($\beta$-methylaminopropionyl)-aminofluorenone;
1-($\beta$-ethylaminopropionyl)-aminofluorenone;
1-($\beta$-diethylaminopropionyl)-aminofluorenone;
1-($\beta$-dimethylaminopropionyl)-aminofluorenone;
1-($\beta$-piperidinopropionyl)-aminofluorenone;
1-[$\beta$-N-(2-hydroxyethyl)piperazinopropionyl]-aminofluorenone;
1-($\alpha$-methylaminopropionyl)-aminofluorenone;
1-($\alpha$-ethylaminopropionyl)-aminofluorenone;
1-($\alpha$-n-butylaminopropionyl)-aminofluorenone;
1-($\alpha$-dimethylaminopropionyl)-aminofluorenone;
1-($\alpha$-diethylaminopropionyl)-aminofluorenone;
1-($\alpha$-piperidinopropionyl)-aminofluorenone;
1-[$\alpha$-N-(2-hydroxyethyl)piperazinopropionyl]-aminofluorenone;
1-(methylaminoacetyl)-aminofluorenone;
1-(ethylaminoacetyl)-aminofluorenone;
1-($\beta$-hydroxyethylaminoacetyl)-aminofluorenone;
1-(n-propylaminoacetyl)-aminofluorenone;
1-(isopropylaminoacetyl)-aminofluorenone;
1-(dimethylaminoacetyl)-aminofluorenone;
1-(diethylaminoacetyl)-aminofluorenone;
1-(di-n-propylaminoacetyl)-aminofluorenone;
1-(pyrrolidinoacetyl)-aminofluorenone;
1-(piperidinoacetyl)-aminofluorenone;
1-(morpholinoacetyl)-aminofluorenone;
1-(hexamethyleneiminoacetyl)-aminofluorenone;
1-(N-methylpiperazinoacetyl)-aminofluorenone;
1-($\beta$-hydroxyethylpiperazinoacetyl)-aminofluorenone;
1-(dimethylaminoacetyl)amino-2-chlorofluorenone;
1-(diethylaminoacetyl)amino-2-chlorofluorenone;
1-(piperidinoacetyl)amino-2-chlorofluorenone;
1-(pyrrolidinoacetyl)amino-2-chlorofluorenone;
1-(hexamethyleneiminoacetyl)amino-2-chlorofluorenone;
1-(N-methylpiperazinoacetyl)amino-2-chlorofluorenone;
1-(N-benzylpiperazinoacetyl)amino-2-chlorofluorenone;
1-($\beta$-hydroxyethylpiperazinoacetyl)amino-2-chlorofluorenone;
1-($\beta$-piperidinopropionyl)amino-2-chlorofluorenone;
1-(piperidinoacetyl)amino-2-bromofluorenone;
1-(dimethylaminoacetyl)amino-4-chlorofluorenone;
1-(diethylaminoacetyl)amino-4-chlorofluorenone;
1-(methylaminoacetyl)amino-4-chlorofluorenone;
1-(ethylaminoacetyl)amino-4-chlorofluorenone;
1-(n-butylaminoacetyl)amino-4-chlorofluorenone;
1-(piperidinoacetyl)amino-4-chlorofluorenone;
1-(N-$\beta$-hydroxyethylpiperazinoacetyl)amino-4-chlorofluorenone;
1-($\alpha$-aminopropionyl)aminofluorenone;
1-(aminoacetyl)aminofluorenone;
1-(aminoacetyl)-4-chlorofluorenone;
1-(N-methylaminoacetyl)aminofluorenone;
1-(N-methylaminoacetyl)amino-4-chlorofluorenone;
1-($\beta$-aminopropionyl)aminofluorenone;
1-(aminoacetyl)aminofluorene;
1-($\alpha$-aminopropionyl)aminofluorene;
1-(methylaminoacetyl)aminofluorene;
1-(ethylaminoacetyl)aminofluorene;
1-(n-butylaminoacetyl)aminofluorene;
1-(dimethylaminoacetyl)aminofluorene;
1-(diethylaminoacetyl)aminofluorene;
1-(pyrrolidinoacetyl)aminofluorene;
1-(piperidinoacetyl)aminofluorene;
1-(N-methylpiperazinoacetyl)aminofluorene;
1-(N-benzylpiperazinoacetyl)aminofluorene;
1-(N-$\beta$-hydroxyethylpiperazinoacetyl)aminofluorene.

The invention also relates to the acid addition salts of the compounds of the Formula I.

This invention relates therefore also to pharmaceutical compositions containing, as active ingredient, at least one compound of the Formula I.

The invention is further described in the following examples which are only illustrative.

EXAMPLE 1

Preparation of 1-($\beta$-methylaminopropionyl)aminofluorenone and the hydrochloride thereof The following mixture is stirred at room temperature during 63 hours:

2.85 g. of 1-($\beta$-chloropropionyl)aminofluorenone
1.66 g. of potassium iodide
1.8 ml. of 33% of methylamine in ethanol
100 ml. of absolute ethanol The solution is then concentrated to dryness and the residue is extracted with a mixture of water and chloroform. After extraction with chloroform, the solution is washed, dried and concentrated to dryness. The residue is recrystallized from ethyl alcohol and after several recrystallizations from the same solvent, yellow orange crystals melting at 136–138° C. are obtained.

The hydrochloride of this compound is prepared by dissolving the base in the minimum amount of chloroform and by adding a methanolic solution of hydrochloric acid. After several recrystallizations from ethanol, the compound melts at 220–222° C.; yellow crystals containing ½ molecule of crystallization water. Yield: 75%.

The 1-($\beta$-chloropropionyl)aminofluorenone used as one of the reactants in this example may be prepared as follows:

In a three necked flask equipped with a condenser, a stirrer and a dropping funnel, the following mixture is placed:

29.25 g. of 1-aminofluorenone
13 ml. of dry pyridine
400 ml. of anhydrous ether 19.05 g. of $\beta$-chloropropionyl chloride dissolved in 70 ml. of anhydrous ether are then added drop by drop. The cooled reaction mixture is stirred during 3 hours at room temperature. After addition of water, the obtained suspension is filtered and the ether solution is concentrated to dryness. The obtained residue is added to the precipitate and the whole is recrystallized from a mixture of chloroform and methanol and then from ethanol. Golden flakes melting at 146–148° C. are obtained with a yield of 85%.

EXAMPLE 2

Preparation of the hydrochloride of 1-(β-ethylaminopropionyl)aminofluorenone

The following mixture is heated during 48 hours:

2.85 g. of 1-(β-chloropropionyl)aminofluorenone
1.66 g. of potassium iodide
5 ml. of a 20% solution of ethylamine
100 ml. of anhydrous ethyl alcohol The solution is then concentrated to dryness, and the residue is extracted with a mixture of water and chloroform. The chloroform phase is separated, washed and dried. The product is concentrated and treated with a solution of HCl in methanol. After several recrystallizations from ethyl alcohol, yellow crystals melting at 232–234° C. are obtained.

EXAMPLE 3

Preparation of 1-(β-diethylaminopropionyl)aminofluorenone and the hydrochloride thereof The following mixture is refluxed during 48 hours:

2.85 g. of 1-(β-chloropropionyl)aminofluorenone
6 ml. of diethylamine
100 ml. of absolute ethyl alcohol The obtained solution is concentrated to dryness and the residue is extracted with a mixture of water and chloroform. After separation of the chloroform phase, this phase is evaporated to dryness and the residue is recrystallized from cyclohexane. Yellowish microcrystals melting at 104–106° C. are obtained. Yield: 81%.

The hydrochloride is prepared by dissolving the base in the minimum amount of chloroform and by adding a stoichiometric amount of hydrochloric acid dissolved in methanol. After several recrystallizations from methanol, yellow crystals melting at 234–236° C. are obtained.

EXAMPLE 4

Preparation of the hydrochloride of 1-(β-dimethylaminopropionyl)aminofluorenone

The following mixture is refluxed during 65 hours:
2.85 g. of 1-(β-chloropropionyl)aminofluorenone and 80 ml. of an ethanol solution containing 33% of dimethylamine are refluxed during 65 hours. The obtained solution is treated as in Example 1. The solution is concentrated and after addition of a methanol solution of hydrochloric acid, the hydrochloride is separated. After several recrystallizations from ethyl alcohol, yellow crystals melting at 323–234° C. are obtained. Yield: 60%.

EXAMPLE 5

Preparation of 1-(β-piperidinopropionyl)aminofluorenone and the hydrochloride thereof The following mixture is refluxed during 48 hours:

2.85 g. of 1-(β-chloropropionyl)aminofluorenone
1.66 g. of potassium iodide
1.85 g. of piperidine
100 ml. of absolute ethyl alcohol The obtained solution is evaporated to dryness and the residue is extracted with a mixture of water and chloroform. The chloroform solution is washed, dried and concentrated to dryness. The residue is recrystallized from cyclohexane. After several recrystallizations from this solvent, yellowish crystals melting at 103–104° C. are obtained.

The hydrochloride prepared by the usual method melts at 238–240° C. after several recrystallizations from ethanol (yellow crystals). Yield: 85%.

EXAMPLE 6

Preparation of the dihydrochloride of 1-[β-N-(2-hydroxyethyl)piperazinopropionyl]aminofluorenone The following mixture is refluxed during 48 hours:

2.85 g. of 1-(β-chloropropionyl)aminofluorenone
2.86 g. of N-(2-hydroxyethyl)piperazine The obtained solution is evaporated to dryness and the residue is taken into a mixture of water and chloroform. The chloroform solution is washed, dried, concentrated and treated with HCl dissolved in methanol. After several recrystallizations in a mixture of methylethyl ketone and methanol, yellow crystals of the dihydrochloride melting at 246–248° C. are obtained. Yield: 85%.

EXAMPLE 7

Preparation of the hydrochloride of 1-(α-methylaminopropionyl)aminofluorenone

The following mixture is refluxed during 48 hours:

2.85 g. of 1-(α-chloropropionyl)aminofluorenone
80 ml. of an ethanol solution containing 33% of methylamine The obtained solution is evaporated to dryness and the residue is extracted with water and chloroform. The chloroform solution is concentrated to a small volume. To the concentrated soltuion 8.3 ml. of a 1.22 N alcoholic solution of HCl are added. The solution is then diluted with ether. The precipitate is filtered and after several recrystallizations from ethyl alcohol, yellowish microcrystals melting at 233–234° C. are obtained. Yield: 60%.

The same product may be obtained from 1-(α-bromopropionyl)aminofluorenone prepared as follows:

The following mixture is placed in a three necked flask equipped with a condenser, a stirrer and a dropping funnel:

25.25 g. of 1-aminofluorenone
40 ml. of anhydrous ether
13 ml. of anhydrous pyridine A solution of 34 g. of α-bromopropionyl bromide in 50 ml. of anhydrous ether is added drop by drop, while stirring at room temperature.

The reaction mixture is stirred during 2 hours at room temperature and then filtered. The precipitate is washed with water and crystallized from ethanol. Yellow needles melting at 108–109° C. are obtained.

EXAMPLE 8

Preparation of 1-(α-ethylaminopropionyl)aminofluorenone and the hydrochloride thereof The following mixture is refluxed during 30 hours:

2.85 g. of 1-(α-chloropropionyl)aminofluorenone
1.66 g. of potassium iodide
100 ml. of absolute ethanol
10 ml. of a methanol solution containing 20% of ethylamine The obtained solution is evaporated to dryness and the residue is taken into a mixture of water and chloroform. After extraction with chloroform, the chloroform solution is washed, dried and concentrated. 8.3 ml. of a 1.22 N solution of HCl in ethanol are added. After addition of ether, the obtained precipitate is recrystallized several times from a mixture of methanol and methylethylketone. Yellow crystals melting at 234–235° C. are obtained. Yield: 80%.

The free base is isolated by dissolving the hydrochloride in water, by making the solution alkaline with sodium bicarbonate and by extracting with chloroform. After several recrystallizations from cyclohexane, a yellow powder melting at 135–137° C. is obtained.

EXAMPLE 9

Preparation of the hydrochloride of 1(α-n-butylaminopropionyl)aminofluorenone

The following mixture is refluxed during 65 hours:

2.85 g. of 1-(α-chloropropionyl)aminofluorenone
2.15 ml. of n-butylamine
1.66 g. of iodide
100 ml. of ethyl alcohol The obtained solution is evaporated and the residue is extracted with water and chloroform. After extraction with chloroform, the chloroform solution is washed, dried and concentrated. 8.3 ml. of ethanol containing HCl (1.22 N) are then added. By adding ether, one obtains a precipitate which is filtered. After several recrystallizations from a mixture of methyl-ethylketone and methanol, a yellow powder melting at 248–249° C. is obtained.

EXAMPLE 10

Preparation of 1-(α-dimethylaminopropionyl)aminofluorenone and the hydrochloride thereof The following mixture is refluxed during 48 hours:

2.85 g. of 1-(α-propionyl)aminofluorenone
80 ml. of an alcoholic solution containing 33% dimethylamine The obtained solution is evaporated to dryness and the residue is taken into a mixture of water and chloroform. After extraction with chloroform, the chloroform solution is washed, dried and concentrated. 8.2 ml. of a 1.22 N solution of HCl in alcohol are added. The hydrochloride is isolated and recrystallized several times from ethyl alcohol. Yellow lemon crystals melting at 236–237° C. are obtained. Yield: 91%.

The base is isolated by dissolving the hydrochloride in water by making the solution alkaline with sodium bicarbonate and by extracting with chloroform. After several recrystallizations from petroleum ether (60–80° C.) a yellow product is obtained, melting at 68–70° C.

EXAMPLE 11

Preparation of 1-(α-diethylaminopropionyl)aminofluorenone and the hydrochloride thereof The following mixture is refluxed during 48 hours:

2.85 g. of 1-(α-chloropropionyl)aminofluorenone
1.66 g. of potassium iodide
100 ml. of methanol
1.6 g. of diethylamine The obtained solution is treated and described in Example 10. The isolated hydrochloride melts at 220–221° C. after several recrystallizations from a mixture of methylethylketone and methanol (yellow crystals). Yield: 71%.

The free base is obtained from the hydrochloride as described in Example 10. A yellow lemon product melting at 99–100° C. is obtained after several recrystallizations from cyclohexane.

EXAMPLE 12

Preparation of 1(α-piperidinopropionyl)aminofluorenone and the hydrochloride thereof The following mixture is refluxed during 48 hours:

2.85 g. of 1-(α-chloropropionyl)aminofluorenone
2.2 ml. of piperidine
100 ml. of absolute ethanol The obtained solution is evaporated to dryness and extracted with chloroform. The chloroform solution is washed, dried and concentrated to dryness. The residue is recrystallized from ethanol. After several recrystallizations from this solvent, yellow needles melting at 178–179° C. are obtained. Yield: 71%.

The hydrochloride is prepared by dissolving the base in chloroform and by adding a 0.54 N solution of HCl in ethanol. After precipitation of the hydrochloride with ether, this product is recrystallized several times from ethyl alcohol. Yellow lemon crystals melting at 232–234° C. are obtained.

EXAMPLE 13

Preparation of 1-(α-N-(2-hydroxyethyl)piperazinopropionyl)aminofluorenone and the hydrochloride thereof The following mixture is refluxed during 48 hours:

2.85 g. of 1-(α-chloropropionyl)aminofluorenone
2.86 g. of N-(β-hydroxyethyl)piperazine
100 ml. of absolute ethyl alcohol By treating the obtained solution, in the usual way, the hydrochloride is isolated with a yield of 73.5%. After several recrystallizations from a mixture of methylethylketone and methanol, yellow flakes melting at 250–252° C. are obtained.

The free base is isolated by the usual way. After several recrystallizations from cyclohexane, a yellow lemon product melting at 80–82° C. is obtained.

EXAMPLE 14

Preparation of 1-(methylaminoacetyl)aminofluorenone and the hydrochloride thereof The following mixture is stirred at room temperature during 5 hours:

3.25 g. of 1-(chloroacetyl)aminofluorenone (prepared as described in Belgian Pat. 666,353)
50 ml. of an ethanol solution containing 33% methylamine The obtained suspension is poured on ice and the obtained precipitate is filtered, washed and recrystallized from a mixture of methanol and water. One obtains 2.65 g. of the base (yield: 80%). After recrystallization from petroleum ether (80–100° C.), yellow flakes melting at 128–130° C. are obtained.

The hydrochloride is prepared by the usual way. Yellow crystals melting at 224–225° C. (decomposition) are obtained.

EXAMPLE 15

Preparation of 1-(ethylaminoacetyl)amino-fluorenone and the hydrochloride thereof The following mixture is refluxed during 40 hours:

0.5 g. of 1-(chloroacetyl)aminofluorenone
15 ml. of a solution of 20% of ethylamine in methanol The obtained solution is cooled and concentrated to dryness. The residue is treated with water and chloroform and the chloroform phase is washed, dried and evaporated to dryness. The obtained yellow residue is taken into a small amount of ether and treated with alcohol containing hydrochloric acid. One obtains a yellow precipitate which after several recrystallizations from ethanol melts at 224–225° C. (decomposition). Yield: 0.32 gram.

From this hydrochloride, the free base is obtained by the usual method. Yellow microcrystals are obtained after several crystallizations from petroleum ether (80–100° C.); M.P. 107–108° C.

EXAMPLE 16

Preparation of 1-(hydroxyethylaminoacetyl)aminofluorenone and the hydrochloride thereof The following mixture is refluxed during 48 hours:

0.5 g. of 1-(chloroacetyl)aminofluorenone, 20 ml. of absolute alcohol, 0.24 g. of ethanolamine.

The obtained solution is evaporated to dryness and the residue is taken into water and chloroform. After extraction with chloroform and evaporation of the chloroform, one obtains an oily residue which is extracted with the minimum amount of chloroform and treated with alcohol containing gaseous hydrochloric acid.

One obtains a precipitate and after several crystallizations from ethanol, yellow crystals melting at 202–203° C. (dec.) are obtained.

The free base is obtained by heating the salt with soda and with chloroform. After evaporation of the chloroform and several crystallizations of the residue from a mixture of benzene and petroleum ether (80–100° C.), orange crystals melting at 127–128° C. are obtained.

EXAMPLE 17

Preparation of 1-(n-propylaminoacetyl)aminofluorenone and the hydrochloride thereof The following mixture is refluxed during 8 hours:

0.5 g. of 1-(chloroacetyl)aminofluorenone, 20 ml. of ethyl alcohol, 1 ml. of n-propylamine.

After 5 hours of refluxing, 0.8 ml. of the amine are added. The obtained solution is evaporated to dryness and the product is recrystallized from a mixture of methanol and water. Yellow orange needles melting at 124–26° C. are obtained with a quantitative yield.

The hydrochloride of the amine is prepared by dissolving the amine into a small amount of alcohol and by treating this solution with a few drops of alcohol containing gaseous hydrochloric acid. The obtained solution is then evaporated to dryness and the residue is recrystallized from isopropanol. Yellow lemon microcrystals melting at 227–228° C. with decomposition are obtained.

EXAMPLE 18

Preparation of 1-(isopropylaminoacetyl)aminofluorenone and the hydrochloride thereof The following mixture is stirred and refluxed during 18 hours:

0.5 g. of 1-(chloroacetyl)aminofluorenone
20 ml. of ethyl alcohol
0.5 ml. of isopropylamine The obtained solution is evaporated to dryness and the residue is extracted with water, filtered and dried. The product is then recrystallized from petroleum ether (80–100° C.) and chromatographed on alumina with benzene. By elution with benzene, a product which is recrystallized from petroleum ether (80–100° C.) and melts at 126–127° C. is obtained.

The hydrochloride of the product is prepared by the usual method. After crystallization from anhydrous ethanol yellow microcrystals melting with decomposition at 252–253° C. are obtained.

EXAMPLE 19

Preparation of 1-(dimethylaminoacetyl)aminofluorenone and the hydrochloride thereof The following mixture is refluxed during 20 hours:

0.5 g. of 1-(chloroacetyl)aminofluorenone
20 ml. of alcohol
2 ml. of a solution of 33% dimethylamine in ethyl alcohol The obtained solution is evaporated to dryness and the residue is taken into water, filtered and dried.

The product is then dissolved into alcohol, and the hydrochloride is recrystallized from anhydrous isopropanol; yellow crystals melting with decomposition at 250–251° C. are obtained. Yield: 0.35 gram.

The base melts after several crystallizations from petroleum ether (80–100° C.) at 132–133° C. (yellow needles). Yield: 80° C.

EXAMPLE 20

Preparation of 1-(diethylaminoacetyl)aminofluorenone and the hydrochloride thereof The following mixture is stirred and refluxed during 48 hours:

0.5 g. of 1-(chloroacetyl)aminofluorenone
20 ml. of ethyl alcohol
0.4 ml. of diethylamine After 15 minutes, a homogeneous solution is obtained and from time to time 0.2 ml. of the amine (total: 1.2 ml.) are added. The obtained solution is evaporated to dryness. The residue is taken into water, filtered and dried.

The product is then chromatographed with benzene on alumina. By elution with benzene, one obtains a product which, after several recrystallization from petroleum ether (80–100° C.), melts at 119–121° C. (yellow crystals). Yield: 90%.

The hydrochloride is prepared by the usual method and recrystallized from isopropyl alcohol. Yellowish microcrystals melting at 192–195° C. (with decomposition) are obtained.

EXAMPLE 21

Preparation of 1-(di-n-propylaminoacetyl)aminofluorenone and the hydrochloride thereof The following mixture is stirred and refluxed during 6 hours:

0.5 g. of 1-(chloroacetyl)aminofluorenone
20 ml. of alcohol
2 ml. of di-n-propylamine The obtained solution is evaporated to dryness and treated with water. The residue is then filtered, dried and recrystallized from methanol; yellow needles melting at 76–78° C. are obtained.

The hydrochloride is prepared by the usual method. By dissolving the base in the minimum amount of chloroform and by treating the solution with a 0.54 N solution of HCl in ethanol and adding ether, the hydrochloride precipitates and is filtered.

After several crystallizations from a mixture of ethyl acetate and methanol, a yellow powder melting at 187–189° C. is obtained.

EXAMPLE 22

Preparation of 1-(pyrrolidinoacetyl)aminofluorenone and the hydrochloride thereof The following mixture is refluxed and stirred during 48 hours:

0.5 g. of 1-(chloroacetyl)aminofluorenone
20 ml. of alcohol
0.33 ml. of pyrrolidine The obtained solution is evaporated to dryness and the residue is extracted with water and ether. The product is extracted with ether. The ether solution is then washed, dried, concentrated, and treated with a small amount of alcohol containing gaseous hydrochloric acid. The hydrochloride is purified by crystallization from ethanol and melts with decomposition at 246–248° (yellow microcrystals).

From the hydrochloride, the free base is obtained by alkalinization and extraction with ether; the amine obtained is purified by crystallization from petroleum ether (80–100° C.) and melts at 106–107.5 C. (yellow lemon needles).

EXAMPLE 23

Preparation of 1-(piperidinoacetyl)aminofluorenone and the hydrochloride thereof The following mixture is refluxed during 49 hours:

0.5 g. of 1-(chloroacetyl)aminofluorenone
0.336 g. of piperidine (0.4 ml.)
20 ml. of absolute ethanol The obtained solution is cooled and evaporated to dryness. The residue is taken with water and with ether. The ether solution is washed, dried, concentrated and treated with alcohol containing hydrochloric acid. One obtains a precipitate which, after crystallizations from ethanol melts with decomposition at 260–262° C. (yellow crystals). By the usual process, the base is isolated. After several crystallizations from petroleum ether (80–100° C.) the yellow product melts at 175–176° C.

EXAMPLE 24

Preparation of 1-(morpholinoacetyl)aminofluorenone and the hydrochloride thereof The following mixture is refluxed during 24 hours:

0.5 g. of 1-(chloroacetyl)aminofluorenone
20 ml. of ethanol
0.35 ml. of morpholine A yellow precipitate is obtained in the solution. The suspension is evaporated to dryness and the residue is treated with water. The filtered and dried product is recrystallized from petroleum ether (80–100°) and melts at 160–160.5° C. (yellow lemon needles). The yield is quantitative.

The hydrochloride is prepared by the usual method and melts at 223–225° with decomposition (ethanol). Yellow microcrystals are obtained with a quantitative yield.

EXAMPLE 25

Preparation of 1-(hexamethyleneiminoacetyl)aminofluorenone and the hydrochloride thereof The following mixture is refluxed during 31 hours:

0.5 g. of 1-(chloroacetyl)aminofluorenone
20 ml. of ethanol
0.39 g. of hexamethyleneimine The obtained solution is evaporated to dryness and the residue is treated with water and ether. After extraction, the ether solution is concentrated and treated with a solution of alcohol containing gaseous hydrochloric acid. The obtained product is purified by recrystallization from ethanol. One obtains with a quantitative yield the hydrochloride which melts with decomposition at 236–238° C. (yellow crystals).

The hydrochloride is treated with diluted soda and the base is extracted with ether. After crystallization from petroleum ether (80–100° C.), it melts at 167–168° C. (yellow needles).

EXAMPLE 26

Preparation of 1-(N-methylpiperazinoacetyl)aminofluoroenone and the hydrochloride thereof The following mixture is refluxed during 20 hours:

5.16 g. of 1-(chloroacetyl)aminofluorenone
4.22 g. of N-methylpiperazine
150 ml. of absolute ethyl alcohol The solvent is evaporated and the residue is stirred with water and the obtained precipitate is filtered and recrystallized from ethyl alcohol. After several recrystallizations from this solvent, yellow needles melting at 159–161° C. are obtained. Yield: 85%.

The hydrochloride is prepared by treating the dissolved base in ether with alcohol containing hydrochloric acid. After several recrystallizations from a mixture of methanol and methyl ethyl ketone, yellow crystals melting at 241–242° C. with decomposition are obtained.

The analysed product corresponds to a product containing 1.5 molecules of hydrochloric acid.

EXAMPLE 27

Preparation of 1-(β-hydroxyethylpiperazinoacetyl) aminofluorenone and the hydrochloride thereof The following mixture is refluxed during 30 hours:

0.5 g. of 1-(chloroacetyl)aminofluorenone
20 ml. of absolute ethanol
0.515 g. of N-(β-hydroxyethyl)piperazine The solvent is then evaporated and the residue is treated with water and chloroform. The chloroform phase is washed, dried and concentrated to dryness. The obtained residue is recrystallized from a mixture of benzene and petroleum ether (80–100° C.).

The hydrochloride of the product is prepared by dissolving the base in the minimum amount of chloroform and by treating the solution with a stoichiometric amount of alcohol containing hydrochloric acid. After addition of ether, the mixture is cooled and the obtained precipitate is crystallized several times from isopropanol. Yellowish microcrystals (containing 1 molecule of water) melting at 227–229° C. are obtained.

EXAMPLE 28

Preparation of 1-(dimethylaminoacetyl)amino-2-chlorofluorenone

The following mixture is refluxed during 21 hours:

3 g. of 1-(chloroacetyl)amino-2-chlorofluorenone
50 ml. of a solution of 33% of dimethylamine in ethanol
30 ml. of anhydrous ethanol The obtained solution is concentrated to dryness and the residue is extracted with a mixture of water and chloroform. After evaporation of the chloroform, the chloroform phase is washed, dried and evaporated to dryness. The obtained residue is recrystallized from cyclohexane. Yellow flakes melting at 171.5–172.5° C. are obtained.

The hydrochloride of the compound is prepared by dissolving the base in the minimum amount of chloroform and by treating the solution with methanol containing gaseous hydrochloric acid. After addition of ether and filtration, the obtained product is purified by several crystallizations from a mixture of methylethylketone and methanol. Yellow microcrystals melting at 256–257° C. are obtained. Yield: 58%.

The same compound may be prepared by the above described method, in which 1 - (bromoacetyl)amino-2-chlorofluorenone or 1 - (iodoacetyl)amino - 2-chlorofluorenone is used instead of 1-(chloroacetyl)amino-2-chlorofluorenone.

The 1-(chloroacetyl)amino-2-chlorofluorenone used as reactant in the above method is prepared as described in Belgian Patent No. 666,353. The 1-(bromoacetyl)amino-2-chlorofluorenone may be obtained by the same method, using bromoacetyl bromide instead of chloroacetyl chloride.

The 1 - (iodoacetyl)amino-2-chlorofluorenone may be prepared by treating 1 - (chloroacetyl)amino-2-chlorofluorenone with potassium iodide in ethanol.

EXAMPLE 29

Preparation of 1-(diethylaminoethyl)amino-2-chlorofluorenone and the hydrochloride thereof The following mixture is refluxed during 24 hours:

3 g. of 1-(chloroacetyl)amino-2-chlorofluorenone
6 ml. of diethylamine
80 ml. of anhydrous ethanol The obtained solution is treated as in Example 28. Yellow microcrystals melting at 119–120° C. are obtained.

The hydrochloride of the product is prepared as described in Example 28. Yellow microcrystals melting at 234–235° C. are obtained. Yield: 80%.

EXAMPLE 30

Preparation of 1-(piperidinoacetyl)amino-2-chlorofluorenone and the hydrochloride thereof The following mixture is refluxed during 48 hours:

3 g. of 1-(chloroacetyl)amino-2-chlorofluorenone
2.2 ml. of piperidine
80 ml. of anhydrous ethanol The obtained solution is treated as in Example 28. Yellow microcrystals melting at 161.5–162.5° C. are obtained. The hydrochloride of this compound prepared as described in Example 28, melts at 258–260° C. Yield: 77%.

EXAMPLE 31

Preparation of 1-(pyrrolidinoacetyl)amino-2-chlorofluorenone and the hydrochloride thereof The following mixture is refluxed during 20 hours:

0.6 g. of 1-(chloroacetyl)amino-2-chlorofluorenone
0.5 g. of pyrrolidine
20 ml. of anhydrous ethanol The obtained solution is treated as in Example 28. The yellow product melts at 137–138° C. The hydrochloride of this compound, prepared as described in Example 28, melts at 251° C. (decomposition). Yield: 74%.

EXAMPLE 32

Preparation of 1-(hexamethyleneiminoacetyl)amino-2-chlorofluorenone and the hydrochloride thereof The following mixture is refluxed during 14 hours:

0.6 g. of 1-(chloroacetyl)amino-2-chlorofluorenone
0.5 ml. of hexamethyleneimine
20 ml. of anhydrous ethanol The reaction mixture is then treated as described in Example 28. Yellow microcrystals melting at 164.5–165.5° C., are obtained.

The hydrochloride of this compound, prepared by the same method as in Example 28, melts at 231.5–232.5° C. Yield: 83%.

EXAMPLE 33

Preparation of 1-(N-methylpiperazinoacetyl)amino-2-chlorofluorenone and the hydrochloride thereof The following mixture is refluxed during 17 hours:

0.6 g. of 1-(chloroacetyl)amino-2-chlorofluorenone
0.5 ml. of N-methylpiperazine
20 ml. of anhydrous ethanol The reaction mixture is then treated as described in Example 28. By recrystallization from a mixture of cyclohexane and chloroform, yellow crystals melting at 186–187° C. are obtained.

The hydrochloride of this compound prepared in the usual manner melts at about 258° C. after recrystallization from a mixture of ethanol and ether. Yield: 75%.

EXAMPLE 34

Preparation of 1-(N-benzylpiperazinoacetyl)-amino-2-chlorofluorenone and the hydrochloride thereof The following mixture is refluxed during 17 hours:

0.6 g. of 1-(chloroacetyl)amino-2-chlorofluorenone
0.78 g. of N-benzylpiperazine
20 ml. of absolute ethanol The solution is then treated as described in Example 28. Small yellow crystals melting at 170–171° C. are obtained by recrystallization from a mixture of cyclohexane and chloroform.

The hydrochloride of this compound (yellow microcrystals) prepared in the usual manner melts at 231–232° C. and contains 1 molecule of water. Yield: 65%.

EXAMPLE 35

Preparation of 1-($\beta$-hydroxyethylpiperazinoacetyl) amino-2-chloro-fluorenone The following mixture is refluxed during 24 hours:

2 g. of 1-(chloroacetyl)amino-2-chlorofluorenone
1.95 ml. of $\beta$-hydroxyethylpiperazine
55 ml. of anhydrous ethanol The reaction mixture is then treated as described in Example 28. Yellow microcrystals melting at 183–184° C. are obtained after recrystallization from a mixture of cyclohexane and chloroform. The yield of the reaction is substantially quantitative.

EXAMPLE 36

Preparation of 2-chloro-1-($\beta$-piperidinopropionyl)aminofluorenone and the hydrochloride thereof The 2-chloro-1-($\beta$ - chloropropionyl)aminofluorenone used as starting material for preparing this compound is prepared as follows:

The following mixture is refluxed during 7 hours:

3 g. of 2-chloro-1-aminofluorenone
2 g. of $\beta$-chloropropionyl chloride
1.5 ml. of anhydrous pyridine
175 ml. of dry toluene The obtained suspension is cooled and treated with water. The toluene solution is washed, dried and evaporated to dryness. The residue is recrystallized from cyclohexane. M.P. 147–148° C. Yield: 50%.

The following mixture is refluxed during 48 hours:

1.6 g. of 2-chloro-1-($\beta$-chloropropionyl) aminofluorenone
0.93 g. of piperidine
50 ml. of anhydrous ethanol The obtained solution is evaporated to dryness and the residue is extracted with a mixture of water and chloroform. The chloroform solution is washed, dried, concentrated and treated with a stoichiometric amount of hydrochloric acid dissolved in methanol, whereafter the solution is diluted with a large amount of ether.

A precipitate of hydrochloride is obtained. After several crystallizations from a mixture of methanol and methyl ethyl ketone, yellow crystals melting at 262–263° C. are obtained.

The base corresponding to the above hydrochloride is prepared by the method described in the first part of Example 28. After crystallization from cyclohexane, the yellow product melts at 190–191° C.

EXAMPLE 37

Preparation of 2-bromo-1-(piperidinoacetyl)aminofluorenone and the hydrochloride thereof The following mixture is stirred and refluxed during a few hours:

1.5 g. of 2-bromo-1-(chloroacetyl) aminofluorenone
0.85 g. of piperidine
80 ml. of anhydrous ethanol The alcohol is then evaporated and the residue is taken up with a mixture of water and chloroform. The chloroform solution is washed, dried, concentrated and treated with a stoichiometric quantity of a methanol solution of hydrochloric acid. The obtained precipitate is purified by crystallization from a mixture of methanol and methylethylketone. Yellow microcrystals of the hydrochloride melting at 249–250° C. are obtained.

The corresponding base is obtained by the usual method. After crystallization from cyclohexane, yellow crystals melting at 150–152° C. are obtained.

The 2-bromo-1-(chloroacetyl)aminofluorenone used as a reactant in this example has been prepared as follows:

The following mixture is refluxed during a few hours:

4.95 g. of 2-bromo-1-aminofluorenone
6 g. of chloroacetyl chloride
4.25 g. of dry pyridine
170 ml. of anhydrous toluene The obtained suspension is cooled, whereafter water is added to it. The precipitate is filtered. After several crystallizations from methylethylketone, yellow microcrystals melting at 251–252° C. are obtained.

2 g. of 1-(chloroacetyl)amino-2-chlorofluorenone
1.95 ml. of $\beta$-hydroxyethylpiperazine
55 ml. of anhydrous ethanol The 2-bromo-1-aminofluorenone is prepared by the following method:

The following mixture is stirred and refluxed during 1 hour:

10 g. of 1-aminofluorenone
9.1 g. of N-bromosuccinimide
500 ml. of pure carbon tetrachloride The obtained suspension is filtered and the precipitate of succinimide is filtered and washed with carbon tetrachloride. The carbon tetrachloride solution is evaporated to dryness and the residue is dissolved in benzene and the solution is chromatographed on basic alumina. The 2-bromo-1-aminofluorenone is thus separated from the 4-bromo-1-aminofluorenone.

The 2-bromo-1-aminofluorenone melts at 149.8–151.2° C. and appears as yellow needles after crystallization from ethanol.

The 4-bromo-1-aminofluorenone melts at 174.2–174.8° C. and appears as orange yellow after crystallization from ethanol.

EXAMPLE 38

Preparation of 1-(dimethylaminoacetyl)amino-4-chlorofluorenone and the hydrochloride thereof The following mixture is refluxed during 21 hours:

3 g. of 1-(chloroacetyl)amino-4-chlorofluorenone
50 ml. of a solution of 33% dimethylamine in ethanol The obtained solution is concentrated to dryness and the residue is extracted with a mixture of water and chloroform. The aqueous phase is decanted and extracted with chloroform. The chloroform extracts are combined, dried, filtered and evaporated to dryness. The obtained residue is recrystallized from cyclohexane. Yellow crystals melting at 177–178° C. are obtained.

The hydrochloride of this compound is prepared by dissolving the base in the minimum amount of chloroform and by treating the solution with methanol containing gaseous hydrochloric acid. After dilution with an excess of ether, the obtained precipitate is filtered and purified by several crystallizations from a mixture of methylethylketone and methanol. Yellow microcrystals melting at 246–247° C. are obtained. Yield: 86%.

The same compound may be prepared by a similar method, in which 1-(bromoacetyl)amino-4-chlorofluorenone or 1-(iodoacetyl)amino-4-chlorofluorenone is used instead of 1-(chloroacetyl)amino-4-chlorofluorenone.

The 1-(chloroacetyl)amino-4-chlorofluorenone used as reactant in the above method may be prepared by a known process, in which 1-amino-4-chlorofluorenone mixed with anhydrous pyridine and anhydrous ether is treated by chloroacetylchloride. The 1-(bromoacetyl)amino-4-chlorofluorenone may be obtained by the same method, using bromoacetylbromide instead of chloroacetylchloride.

The 1-(iodoacetyl)amino-4-chlorofluorenone may be prepared by treating 1-(chloroacetyl)amino-4-chlorofluorenone with potassium iodide in ethanol.

EXAMPLE 39

Preparation of 1-(diethylaminoacetyl)amino-4-chlorofluorenone and the hydrochloride thereof The following mixture is refluxed during 24 hours:

3 g. of 1-(chloroacetyl)amino-4-chlorofluorenone
6 ml. of diethylamine
100 ml. of anhydrous ethanol The reaction mixture is then treated as described in Example 37. Yellow crystals melting at 161–162° C. are obtained.

The hydrochloride of this compound prepared in the usual manner melts at 224–225° C. Yield: 81%.

EXAMPLE 40

Preparation of 1-(methylaminoacetyl)amino-4-chlorofluorenone and the hydrochloride thereof The following mixture is stirred at room temperature during 7.5 hours:

3 g. of 1-(chloroacetyl)amino-4-chlorofluorenone
40 ml. of a 33% solution of methylamine in anhydrous ethanol The obtained suspension is evaporated to dryness and the residue is extracted with a mixture of water and chloroform. The chloroform solution is washed, dried and concentrated to dryness. The residue is taken up in the minimum of chloroform and treated with a solution of methanol containing hydrochloric acid. After addition of ether, the obtained product is purified by crystallization from a mixture of methylethylketone and methanol. The obtained hydrochloride (yellow crystals) melts at 238–239° C.

The corresponding base, prepared as described in Example 37, melts at 163–164° C. (yellow crystals).

EXAMPLE 41

Preparation of 1-(ethylaminoacetyl)amino-4-chlorofluorenone and the hydrochloride thereof 3 g. of 1-(chloroacetyl)amino-4-chlorofluorenone
80 ml. of a 20% solution of ethylamine in ethanol The reaction mixture is then treated as described in Example 37. A yellow product melting at 139.5–140.5° C. is obtained.

The hydrochloride of this compound is prepared in the usual manner. Yellow microcrystals melting at 219–220° C. are obtained. Yield: 80%.

EXAMPLE 42

Preparation of 1-(n-butylaminoacetyl)-amino-4-chlorofluorenone and the hydrochloride thereof The following mixture is refluxed during 24 hours:

3 g. of 1-(chloroacetyl)amino-4-chlorofluorenone
4 ml. of n-butylamine
100 ml. of anhydrous ethanol The obtained solution is treated as described in Example 37. Yellow microcrystals melting at 127–128° C. are obtained.

The hydrochloride of this compound, prepared as described in Example 37, melts at 234–235° C. Yield: 94%.

EXAMPLE 43

Preparation of 1-piperidinoacetyl(amino-4-chlorofluorenone) and the hydrochloride thereof The following mixture is refluxed during 48 hours:

3 g. of 1-(chloroacetyl)amino-4-chlorofluorenone
2.2 ml. of piperidine
80 ml. of anhydrous ethanol The obtained solution is treated as described in Example 37. The obtained yellow product melts at 213–214° C. The hydrochloride of this compound melts at 261–262° C. Yield: 87%.

EXAMPLE 44

Preparation of 1 - (N - β - hydroxyethylpiperazinoacetyl) amino-4-chlorofluorenone and the hydrochloride thereof The following mixture is refluxed during 24 hours:

3 g. of 1-(chloroacetyl)amino-4-chlorofluorenone
2.9 ml. of N-β-hydroxyethylpiperazine
80 ml. of anhydrous ethanol The obtained solution is treated as described in Example 37.

After recrystallization from benzene, yellow needles melting at 196–197° C. are obtained.

The hydrochloride of this compound (yellow microcrystals) melts at 265–266° C. Yield: 90%.

EXAMPLE 45

(a) Preparation of benzyl ester of 9-fluorenone-1-(α-carbamoylethyl)carbamic acid The following mixture is stirred during 72 hours:

9.75 g. of 1-aminofluorenone
12 g. of N,N'-dicyclohexylcarbodiimide
11.2 g. of N-carbobenzoxyalanine
125 ml. of anhydrous tetrahydrofuran The insoluble N,N'-dicyclohexylurea is then removed by filtration and the filtrate is concentrated to dryness. The residue is extracted with ether and yellow crystals are obtained. After filtration and recrystallization from methanol, yellow crystals melting at 151–153° C. are obtained. Yield: 52.5%.

(b) Preparation of the hydrochloride of 1-(α-aminopropionyl)aminofluorenone 4.0 g. of the benzyl ester prepared in Section (a) of this example are poured, with stirring, in 40 ml. of a 30% solution of hydrobromic acid in acetic acid. After 35 minutes, the suspension is diluted with 250 ml. of anhydrous ether and, after 20 minutes, the obtained precipitate is filtered, washed with ether, dried and dissolved in water. Powdered sodium bicarbonate is added until the solution is neutral. The obtained precipitate is filtered, washed with water, dried and dissolved in a mixture of chloroform and methanol. After addition of a stoichiometric amount of methanol containing hydrochloric acid and dilution of the solution with ether, the obtained hydrochloride is filtered and recrystallized several times from a mixture of methanol and methyl ethyl ketone. Yellow crystals crystallizing with ½ molecule of water and melting (with decomposition) at 239–241° C. are obtained.

EXAMPLE 46

Preparation of 1-(aminoacetyl)aminofluorenone and the hydrochloride thereof (A) First method.—The following mixture is stirred at room temperature during 9 hours.

8.2 g. of 1-(bromoacetyl)aminofluorenone
250 ml. of methanol saturated with gaseous ammonia The reaction mixture is then diluted with ice and the obtained precipitate is filtered and recrystallized from a mixture of chloroform and petroleum ether. Orange-yellow crystals melting (with decomposition) at 242–244° C. are obtained. Yield: 85%.

The hydrochloride of this compound is prepared by dissolving the base in methanol and by treating the obtained solution with a stoichiometric quantity of hydrochloric acid in methanol. Yellow microcrystals melting at 219–221° C. are obtained after crystallization from a mixture of methanol and methyl ethyl ketone.

When this hydrochloride is dissolved in water and when the obtained solution is treated with sodium bicarbonate, one obtains a base melting at 162–164° C. after crystallization from a mixture of chloroform and petroleum ether. The base melting at 162–164° C. may be converted spontaneously into the base melting at 242–244° C. by crystallization or heating at a temperature higher than the melting point thereof. The base melting at 162–164° C. gives a hydrochloride melting at 219–221° C., which is identical to the above hydrochloride.

The 1-(bromoacetyl)aminofluorenone used as one of the reactants in this method may be prepared as follows:

The following mixture is placed in a three-necked flask equipped with a condenser with drying tube, a stirrer and a dropping funnel:

1 g. of 1-aminofluorenone
0.44 g. of dry pyridine
25 ml. of anhydrous ether

To said mixture a solution of 1.1 g. of bromoacetyl bromide in a small quantity of ether is added drop by drop.

The reaction mixture is stirred during two hours, whereafter a small amount of water is added. The obtained precipitate is filtered and recrystallized from methanol. Thin yellow needles melting at 142–143° C. are obtained.

(B) Second method.—From 7 g. of 1-(iodoacetyl)aminofluorenone treated, as described in the first method, with 250 ml. of a solution of gaseous ammonia in methanol, 1 - (aminoacetyl)aminofluorenone is obtained substantially with a quantitative yield.

The 1-(iodoacetyl)aminofluorenone used as one of the reactants in this method may be prepared as follows:

The following mixture is refluxed during 23 hours:

0.5 g. of 1-(chloroacetyl)aminofluorenone
0.36 g. potassium iodide
50 ml. of anhydrous acetone The reaction mixture is then filtered while hot and the potassium chloride is washed with boiling acetone. The obtained solution is concentrated to dryness. The residue is recrystallized from a mixture of benzene and petroleum ether and then from cyclohexane containing a small amount of chloroform. Orange yellow needles melting at 163–163.5° C. are obtained with a substantially quantitative yield.

EXAMPLE 47

Preparation of the hydrobromide of 1-(aminoacetyl)aminofluorenone 4.5 g. of the benzyl ester of 9-fluorenone-1-(carbamoylmethyl)-carbamic acid are treated with 45 ml. of a 20% solution of hydrobromic acid in acetic acid. After stirring during 5 minutes, a gelatinous orange precipitate is obtained. After further stirring during 35 minutes, 270 ml. of anhydrous ether are added. A yellow orange precipitate is obtained and, after 10 minutes, this precipitate is filtered and dried under vacuum.

After crystallization from a mixture of ethanol and methyl ethyl ketone, 4.4 g. of hydrobromide melting (with decomposition) at 245–247° C. are obtained.

Said hydrobromide may be converted into the free base, by treatment with sodium carbonate, as described in Section (b) of Example 45.

The benzyl ester of 9-fluorenone-1-(carbamoylmethyl)-carbamic acid used in this example may be prepared as follows:

The following mixture is stirred at room temperature during 47 hours:

10 g. of 1-aminofluorenone
10.5 g. of carbobenzoxyglycine
12 g. of N,N'-dicyclohexyldicarbodiimide
125 ml. of tetrahydrofuran The mixture is then heated on a water bath during a few minutes and cooled with ice. After addition of 10 ml. of acetic acid, the mixture is filtered for removing the dicyclohexylurea and the filtered precipitate is washed with ether and chloroform. The filtrate is evaporated under reduced pressure and the residue is taken up with ether. The ether solution is evaporated to dryness and the residue is recrystallized from methanol. 5.6 g. of yellow needles melting at 153–154° C. are obtained.

EXAMPLE 48

Preparation of 1-(aminoacetyl)amino-4-chlorofluorenone

The following mixture is stirred during 6 days at room temperature:

8.2 g. of 1-(bromoacetyl)amino-4-chlorofluorenone
400 ml. of methanol saturated with gaseous ammonia The obtained suspension is filtered and the filtered product is washed with water and dried.

5.7 g. of a product melting at 236–238° C. (with decomposition) are obtained. After a few crystallizations from benzene, yellow crystals melting at 240–245° C. (with decomposition) are obtained.

The same product may be prepared from 1-(iodoacetyl) amino-4-chlorofluorenone prepared as described hereafter.

7.2 g. of 1-(iodoacetyl)amino-4-chlorofluorenone in 500 ml. of a solution of methanol saturated with gaseous ammonia are stirred during 40 hours at room temperature. The obtained suspension is cooled and filtered. The obtained product is washed with water and dried. After crystallization from benzene, yellow crystals melting at about 240° C. (decomposition) are obtained with a yield of 75%.

EXAMPLE 49

(a) Preparation of 1-tosylaminofluorenone

The following mixture is refluxed during 2 hours:

1.95 g. of 1-aminofluoroenone
2.47 g. of p-toluenesulfonyl chloride
20 ml. of anhydrous pyridine The reaction mixture is then distilled so as to remove the half of pyridine. After addition of ice and water, while stirring, the mixture is filtered and the isolated precipitate is recrystallized several times from a mixture of ethanol and chloroform. Beige crystals melting at 153–154° C. are obtained.

(b) Preparation of 1-(N-methyl-N-tosyl) aminofluorenone

In a three-necked container equipped with a stirrer, a separator, a cooler and a drying tube, 7 g. of 1-tosylaminofluorenone dissolved in 200 ml. of anhydrous xylene are introduced. The obtained solution is refluxed and 50 ml. of xylene are distilled, so as to dry the starting material.

5.75 ml. of a solution of sodium methanolate prepared from 10 g. of sodium in 100 cc. of absolute methanol are then added.

After the addition of the sodium methanolate, a precipitate of the sodium salt is immediately obtained. After distillation of the methanol, the mixture is refluxed during 30 minutes. 2.3 g. of dimethyl sulphate are then added and the mixture is again refluxed, while being stirred, during 1.5 hours.

To the cooled solution, 50 ml. of 3 N caustic soda are added, in order to destroy the excess of dimethylsulphate, whereafter the solution is refluxed during 15 minutes. The xylene phase separated from the cooled solution is washed with water, dried and evaporated to dryness. The residue is recrystallized from ethanol. Pale yellow microcrystals melting at 124–125° C. are obtained.

(c) Preparation of 1-methylaminofluorenone 0.37 g. of 1-(N-methyl-N-tosyl)aminofluorenone are added to 4 ml. of concentrated sulphuric acid.

The mixture is stirred during 30 minutes at room temperature. After addition of 25 ml. of water, the mixture is boiled and filtered while hot. The filtrate is cooled and made alkaline by means of concentrated soda. The obtained precipitate is filtered and dried. After several crystallizations from petroleum ether (40–60° C.), orange yellow crystals melting at 125–126° C. are obtained.

(d) Preparation of 1-(N-methylchloroacetyl) aminofluorenone

The following mixture is refluxed:

14.6 g. of 1-methylaminofluorenone
1700 ml. of anhydrous toluene
22.7 ml. of pyridine The obtained solution is cooled and 21.1 ml. of chloroacetyl chloride dissolved in 150 ml. of toluene are added drop by drop to this solution. The obtained mixture is then refluxed during one hour. The toluene phase separated from the cooled solution is washed successively with water, with 1 N hydrochloric acid, with sodium bicarbonate and with water and finally dried. The oily precipitate obtained after evaporation of the toluene is treated with ethanol. 19 g. (yield: 95.5%) of crystals are obtained. After crystallization from isopropanol, yellow microcrystals are obtained; M.P. 119–121° C.

(e) Preparation of 1-(N-methyliodoacetyl) aminofluorenone

The following mixture is refluxed during 40 hours:

2.25 g. of 1-(N-methylchloroacetyl)aminofluorenone
2.25 g. of potassium iodide
60 ml. of acetone The obtained solution is evaporated to dryness and the residue is taken up in a mixture of water and chloroform. After extraction with chloroform, the chloroform phase is evaporated to dryness and the residue is taken up in cyclohexane and recrystallized. 2.28 g. (yield: 96%) of yellow microcrystals melting at 115–117° C. are obtained.

(f) Preparation of 1-(N-methylaminoacetyl)aminofluorenone

A mixture of 1.5 g. of 1-(N-methyliodoacetyl)aminofluorenone and of a solution of methanol containing 20 g. of ammonia per 100 ml. of solution is stirred during three hours at room temperature.

The mixture is then cooled with ice and the obtained precipitate is filtered. After several recrystallizations from acetone, yellow crystals melting at 235–237° C. (with decomposition) are obtained.

EXAMPLE 50

(a) Preparation of 4-chloro-1-(p-toluenesulfonyl)aminofluorenone

The following mixture is refluxed:

2.3 g. of 4-chloro-1-aminofluorenone
2.47 g. of p-toluene sulfonyl chloride
20 ml. of anhydrous pyridine The obtained mixture is diluted with ice and the precipitate is filtered. After recrystallization from a mixture of chloroform and methanol, yellow needles melting at 176–177° C. are obtained with a substantially quantitative yield.

(b) Preparation of 4-chloro-1-(N-methyl-N-p-toluenesulfonyl) aminofluorenone

In a three necked flask equipped with a stirrer and a device for azeotropic removal of water, 10 g. of 4-chloro-1-(p-toluenesulfonyl) aminofluorenone dissolved in 265 ml. of anhydrous xylene are introduced. The mixture is boiled and 25 ml. of xylene are distilled. The solution is then cooled, whereafter 7.7 ml. of a solution of sodium methanolate prepared from 1 g. of sodium and 10 ml. of methanol are added. The obtained suspension is refluxed and 25 to 50 ml. of xylene are removed by distillation. After cooling of the suspension 4.7 ml. of dimethyl sulphate are added and the mixture is again refluxed during 4.5 hours. An excess of 3 N caustic soda is then added to the cooled suspension, which is filtered. The xylene phase is separated, washed and dried. After evaporation in vacuo, the obtained residue is recrystallized from ethanol. Yellow microcrystals melting at 157.5–158.5° C. are obtained.

(c) Preparation of 4-chloro-1-methylaminofluorenone from 1-(N-methyl-p-toluenesulfonyl)amino-4 - chlorofluorenone The following mixture is stirred during 30 minutes in a moisture free atmosphere:

5.9 g. of 4-chloro-1-(N-methyl-N-toluenesulfonyl)aminofluorenone
59 ml. of concentrated sulphuric acid The obtained suspension is poured on 250 g. of ice and refluxed. After cooling, the mixture is neutralized with a solution of sodium hydroxide. The solution is then extracted with chloroform and the chloroform extract is washed with water and dried. After evaporation of the solvent, the residue is recrystallized from cyclohexane. Crystals melting at 172.5–174° C. are obtained.

(d) Preparation of 4-chloro-1-methylaminofluorenone from 4-chloro-1-aminofluorenone The following mixture is heated at 80° C.:

0.69 g. of 4-chloro-1-aminofluorenone
4.2 g. of trimethyl phosphate

To this mixture, 0.52 g. of lithium bromide are added and the mixture is heated to 150° C. and maintained at this temperature during 4 hours.

5 ml. of a 10% solution of sodium hydroxide are then added to the solution which has been cooled to 95° C. The solution is thereafter heated at about 150° C. and maintained at this temperature during 15 minutes. After cooling and addition of ice to the suspension, the formed precipitate is filtered and recrystallized from cyclohexane. Crystals melting at 172.5–174° C. are obtained.

(e) Preparation of 1-(N-methyl-N-bromoacetyl)amino-4-chlorofluorenone

The following mixture is refluxed during 4.5 hours:

4.8 g. of 4-chloro-1-methylaminofluorenone
2/L ml. of bromoacetyl bromide
140 ml. of anhydrous benzene The solution is then cooled and treated with 2 N caustic soda, whereafter it is washed, dried and evaporated to dryness. The obtained residue is recrystallized from a mixture of benzene and petroleum ether. Yellow crystals melting at 153–153.5° C. are obtained.

(f) Preparation of 1-(N-methyl-aminoacetyl)amino-4-chlorofluorenone

The following mixture is stirred at room temperature during 1 hour:

0.365 g. of 4-chloro-1-(N-methyl-bromoacetyl)aminofluorenone
17 cc. of a solution of methanol saturated with ammonia The obtained suspension is filtered and the product is dried and recrystallized from chloroform. Yellow microcrystals melting at 264–266° C. are obtained.

EXAMPLE 51

(a) Preparation of benzylester of 1-(9-fluorenone)-β-carbamoylethylcarbamic acid The following mixture is stirred during 90 hours at room temperature:

9.75 g. of 1-aminofluorenone
11.25 g. of N-carbobenzoxy-β-alanine
11 g. of N-, N'-dicyclohexylcarbodiimide
250 ml. of tetrahydrofuran The mixture is then refluxed during 2.5 hrs., the solution thus obtained is cooled, and 10 ml. of acetic acid are added. Thereafter, the mixture is stirred and the suspension is filtered. The filtrate is evaporated to dryness and the residue is taken into ether. That part which is insoluble in ether is recrystallized from ethyl alcohol and yellow crystals melting at 157–159° C. are obtained. Yield: 4 g.

(b) Preparation of 1-(β-aminopropionyl)aminofluorenone and the hydrochloride thereof Into a three-necked flask equipped with a stirrer, 25 ml. of a 20% solution of hydrobromic acid in acetic acid are poured and 2.5 g. of benzyl ester of 1-(9-fluorenone)-β-carbamoylethylcarbamic acid are added. After 15 minutes of stirring, a gelatinous precipitate is formed and after 35 minutes 150 ml. of anhydrous ether are added.

The mixture is then further stirred during 15 minutes and the suspension is filtered. The obtained precipitate is dried and dissolved in water. After filtration, this solution is neutralized with solid sodium bicarbonate and the suspension is extracted with chloroform. The chloroform solution is washed, dried and evaporated to dryness and the obtained residue is recrystallized from a mixture of benzene and petroleum ether.

Yellow crystals melting at 98–100° C. are obtained. The hydrochloride is obtained by treating a solution of this base in chloroform with hydrochloric acid dissolved in methanol. After several recrystallizations from methyl alcohol, yellow crystals melting at 266–268° C. are obtained. The yield is almost quantitative.

EXAMPLE 52

(a) Preparation of 1-chloroacetylaminofluorene

The following mixture is introduced into a three-necked flask:

24 g. of 1-aminofluorene in 750 ml. of anhydrous ether containing 19.2 ml. of dry pyridine To the above mixture, cooled with ice, a solution of 19.2 ml. of chloroacetyl chloride in 150 ml. dry ether is added dropwise. The mixture is then allowed to react during two hours at room temperature. At the end of that period of time, the ether is evaporated and replaced by chloroform and the chloroform solution is washed with water, dried and evaporated to dryness. The residue is recrystallized from benzene. Fine white needles melting at 183–184° C. are obtained. Yield: 92%.

(b) Preparation of 1-iodoacetylaminofluorene

The following mixture is refluxed during three hours:

6.8 g. of 1-choroacetylaminofluorene
5 g. of potassium iodide
1000 ml. of acetone Thereafter, the suspension is concentrated and then poured onto ice. The obtained precipitate is filtered, washed, dried and recrystallized from chloroform. White microcrystals melting at 209–211° C. are obtained. Yield: 89%.

(c) Preparation of 1-(aminoacetyl)aminofluorene and the acid addition salts thereof (1) First method starting from 1-iodoacetylaminofluorene.—The following mixture is stirred at room temperature during 48 hours:

8.5 g. of 1-iodoacetylaminofluorene
1500 ml. of methyl alcohol saturated with gaseous ammonia At the end of the above period of time, there is obtained a solution which is evaporated to dryness and the residue thereof is recrystallized from chloroform containing a little amount of methanol. The hydroiodide of 1-(aminoacetyl)aminofluorene is obtained as white crystals melting at 264–265° C. Yield: 78%.

The corresponding base is obtained by dissolving the hydroiodide in water and adding thereto an excess of a sodium bicarbonate solution. The base which precipitates is filtered, washed with water, dried and recrystallized from a mixture of acetone and water. White microcrystals melting at 160–161° C. are obtained.

The hydrochloride is obtained by treating the base dissolved in methyl alcohol by means of hydrochloric acid. After crystallization from a mixture of methyl alcohol and methylethyl ketone, the desired product is obtained having the appearance of a white cotton-wool melting at 284–285° C.

(2) Second method.—The benzyl ester of 1-fluorenecarbamoyl methylcarbamic acid is first prepared as follows:

The following mixture is stirred during 18 hours at room temperature:

3.6 g. of 1-aminofluorene
4.2 g. of carbobenzoxyglycine
5 g. of dicyclohexylcarbodiimide
40 ml. of dry tetrahydrofuran Thereafter, a little amount of acetic acid is added to destroy the unreacted dicyclohexylcarbodiimide and the suspension is filtered to remove the dicyclohexylurea.

The filtrate is evaporated to dryness and recrystallized from benzene. White microcrystals melting at 169–170° C. are obtained. Yield: 72%.

The benzyl ester of 1-fluorenecarbamoyl methylcarbamic acid is hydrolyzed as follows:

The following mixture is stirred at room temperature during 45 minutes:

1 g. of benzyl ester
10 ml. of a 30% solution of hydrobromic acid in anhydrous acetic acid Thereafter, 60 ml. of dry ether are added dropwise and the mixture is agitated during 15 minutes.

A precipitate is formed, filtered, dried and recrystallized from water. The hydrobromide of 1-(aminoacetyl) aminofluorene is obtained with a yield of 93% as white microcrystals melting at 270–271° C., the base of which is released by adding sodium bicarbonate to an aqueous solution of the hydrobromide. Said base is identical with the product obtained according to the first method hereabove.

EXAMPLE 53

(a) Preparation of the benzyl ester of 1-fluorene carbamoyl-α-ethylcarbamic acid The following mixture is stirred at room temperature during 18 hours:

3.35 g. of 1-aminofluorene
4.5 g. of carbobenzoxyalanine
4.7 g. of dicyclohexylcarbodiimide
50 ml. of dry tetrahydrofuran Thereafter, a little amount of acetic acid is added, the mixture is stirred during 15 minutes and the suspension is filtered. The filtrate is evaporated to dryness and the obtained residue is recrystallized from a mixture of cyclohexane and chloroform. White crystals melting at 161–162° C. are obtained: Yield: 81%.

(b) Preparation of 1-(α-aminopropionyl)aminofluorene and acid addition salts thereof by hydrolysis of the benzyl ester of 1-fluorene carbamoyl-α-ethylcarbamic acid The second method of Example 52c is applied. However, after having obtained the hydrobromide (melting point about 232–234° C.), the base is released in the usual way and white microcrystals melting at 132–134° C. and containing ½ mole of water per mole of product are obtained.

The hydrochloride is prepared by treating the base dissolved in methyl alcohol by means of a methanol solution of hydrochloric acid and after recrystallization from isopropyl alcohol, white microcrystals melting at 241–243° C. are obtained. Overall yield: 91%.

EXAMPLE 54

Preparation of 1-(methylaminoacetyl)aminofluorene and the hydrochloride thereof

The following mixture is stirred at room temperature during 65 hours:

0.775 g. of 1-chloroacetylaminofluorene
13 ml. of methylethylketone
12 ml. of a 33% solution of methylamine in ethyl alcohol Thereafter, the solution is evaporated to dryness and the residue is extracted with chloroform and diluted soda. The chloroform solution is washed, dried, evaporated to dryness and the residue is extracted with hot cyclohexane. The solution is concentrated in order to obtain white crystals melting at 117–118° C. Yield: 62.5%. The hydrochloride prepared in the usual way has the appearance of white crystals melting (decomposing) at about 270° C.

EXAMPLE 55

Preparation of 1-(ethylaminoacetyl)aminofluorene and the hydrochloride thereof

The following mixture is stirred at room temperature during a few days:

0.775 mg. of 1-chloroacetylaminofluorene
16 ml. of methylethylketone
9 ml. of a 20% solution of ethylamine in ethyl alcohol Thereafter, the method of Example 54 is applied and the hydrochloride is obtained with a yield of 40% as white crystals melting with decomposition at 264–266° C. The base has not been isolated as a solid.

EXAMPLE 56

Preparation of 1-(n-butylaminoacetyl) aminofluorene hydrochloride

The following mixture is stirred at room temperature during a few hours:

3.1 g. of 1-chloroacetylaminofluorene
2.64 ml. of n-butylamine
100 ml. of methylethylketone Thereafter, the method of Example 54 is applied and the hydrochloride is obtained with a yield of 40% as white crystals melting at 268–270° C.

The base has not been isolated.

EXAMPLE 57

Preparation of 1-(dimethylaminoacetyl)aminofluorene and the hydrochloride thereof The following mixture is stirred at room temperature during 65 hours:

0.775 g. of 1-chloroacetylaminofluorene
10 ml. of methylethylketone
15 ml. of a 33% solution of dimethylamine in ethyl alcohol Thereafter, the method of Example 54 is applied and the hydrochloride is obtained with a yield of 85% as white crystals melting at 161–162° C. (isopropyl alcohol).

The base is obtained as white flakes (cyclohexane) and melts at 136.5–137.5° C.

EXAMPLE 58

Preparation of 1-(diethylaminoacetyl)aminofluorene and the hydrochloride thereof The following mixture is stirred during 65 hours at room temperature:

0.775 g. of 1-chloroacetylaminofluorene
1.8 ml. of diethylamine
25 ml. of methylethylketone Thereafter, the method of Example 54 is applied and the hydrochloride is obtained as white crystals melting at 113–114° C. (methylethylketone).

The base melts at 69–70° C. and has the appearance of a white cotton-wool. Yield: 85.5% (petroleum ether).

EXAMPLE 59

Preparation of 1-(pyrrolidinoacetyl)aminofluorene and the hydrochloride thereof

The following mixture is stirred during 65 hours at room temperature:

0.775 g. of 1-chloroacetylaminofluorene
0.75 ml. of pyrrolidine
25 ml. of methylethylketone Thereafter, the method of Example 54 is applied and the hydrochloride is obtained as white crystals melting at 128–129° C. (methylethylketone). Yield: 67%.

The base in the form of white microcrystals melts at 92–92.5° C. (cyclohexane).

EXAMPLE 60

Preparation of 1-(piperidinoacetyl)aminofluorene and the hydrochloride thereof

The following mixture is stirred at room temperature during 48 hours:

0.775 g. of 1-chloroacetylaminofluorene
0.7 ml. of piperidine
25 ml. of methylethylketone Thereafter, the method of Example 54 is applied and the hydrochloride is obtained as white crystals melting at 233–234° C. (isopropyl alcohol).

The base is obtained as needles melting at 143–144° C. (cyclohexane). Yield: 77.5%.

EXAMPLE 61

Preparation of 1-(N-methylpiperazinoacetyl) aminofluorene

The following mixture is refluxed during 3 hours 30 minutes:

2.33 g. of 1-chloroacetylaminofluorene
2.1 ml. of N-methylpiperazine
60 ml. of methylethylketone Thereafter, the method of Example 54 is applied and the base is obtained as white crystals melting at 135.5–136.5° C. Yield: 69.5%.

EXAMPLE 62

Preparation of 1-(N-benzylpiperazinoacetyl) aminofluorene

The following mixture is refluxed during 20 hours:

1.7 g. of 1-chloroacetylaminofluorene
2.73 g. of N-benzylpiperazine
50 ml. of methylethylketone Thereafter, the method of Example 54 is applied and the base is obtained as white crystals melting at 101–102° C. (cyclohexane). Yield: 74%.

EXAMPLE 63

1-(N-[3-hydroxyethylpiperazinoacetyl)aminofluorene

The following mixture is refluxed during 5 hours:

2.33 g. of 1-chloroacetylaminofluorene
2.4 ml. of N-β-hydroxyethylpiperazine
60 ml. of methylethylketone Thereafter, the method of Example 54 is applied and the base is obtained as white crystals melting at 132–132.5° C. (cyclohexane-benzene). Yield: 70%.

The derivatives according to the present invention are useful in the pharmaceutical field and could be used in several pathological conditions in consideration with their very interesting pharmacodynamic properties, particularly on the central and peripheral nervous system. They exert, although with an unequal intensity, a hypnosedative, anticonvulsive, tranquillizing, relaxing, and sympathetic activity which shows a beneficial influence on the functions of the brain and of the medulla, including pathological conditions resulting from alterations in the function of the extrapyramidal system.

They could also be used in several psychopathologic conditions when an anxiolytic, antiphobic or neuroplegic activity is looked for. In several compounds, other interesting activities are recognized such as analgesic, antiinflammatory, antispasmodic, antithermic, cardiovascular and antifibrillating effects and even antibacterial, antiparasitic, antifungic and antiblastic properties.

The compounds of this invention are administrable orally, rectally and parenterally with conventional excipients at daily doses of two to six hundred milligrams for treatment of mammals suffering from e.g. Parkinson's disease, myotonia, psychoneurosis, insomnia, epilepsy, excitation states, pain conditions, rheumatic diseases or hyperthermia.

What is claimed is:
1. The compound 1 - (N - methylpiperazinoacetyl) aminofluorene.

References Cited

UNITED STATES PATENTS 3,408,389  10/1968  Bernstein et al. _____ 260—562

ALEX MAZEL, Primary Examiner

J. TOVAR, Assistant Examiner

U.S. Cl. X.R.

260—239 BF, 247.2 F, 294 A, 326.3, 562 N; 424—250